(12) United States Patent
Kwon et al.

(10) Patent No.: US 7,095,695 B2
(45) Date of Patent: Aug. 22, 2006

(54) OPTICAL RECORDING REPRODUCING APPARATUS AND OPTICAL RECORDING MEDIUM USED THEREIN

(75) Inventors: Hyouk Kwon, Seoul (KR); Young Joo Yee, Seongnam (KR); Jong Uk Bu, Seongnam (KR)

(73) Assignee: LG Electronics Inc., Seoul (KR)

( * ) Notice: Subject to any disclaimer, the term of this patent is extended or adjusted under 35 U.S.C. 154(b) by 439 days.

(21) Appl. No.: 10/460,202

(22) Filed: Jun. 13, 2003

(65) Prior Publication Data

US 2004/0252592 A1 Dec. 16, 2004

(51) Int. Cl.
*G11B 7/00* (2006.01)
*G11B 7/24* (2006.01)

(52) U.S. Cl. ............... 369/53.45; 369/47.1; 369/275.1; 369/283

(58) Field of Classification Search .................... None
See application file for complete search history.

(56) References Cited

FOREIGN PATENT DOCUMENTS

JP       2003051134 A   *   2/2003

* cited by examiner

*Primary Examiner*—Muhammad Edun
(74) *Attorney, Agent, or Firm*—Birch, Stewart, Kolasch & Birch, LLP

(57) ABSTRACT

Disclosed are an optical recording reproducing apparatus which can effectively remove contamination material attached thereto and an optical recording medium used in the optical recording reproducing apparatus. To this end, the apparatus comprises: a catalyst layer formed at a specific part thereof; and a light irradiation unit for irradiating light on the catalyst layer. An optical disc used in an optical recording reproducing apparatus includes a catalyst layer.

11 Claims, 3 Drawing Sheets

OPTICAL DISC

OPTICAL DISC

OPTICAL RECORDING REPRODUCING APPARATUS AND OPTICAL RECORDING MEDIUM USED THEREIN

BACKGROUND OF THE INVENTION

1. Field of the Invention

The present invention relates to an optical recording reproducing apparatus, and more particularly, to an optical recording reproducing apparatus and an apparatus for removing dust and contamination material attached to an optical disc.

2. Description of the Related Art

Generally, an optical recording reproducing apparatus is an apparatus for making laser beam irradiated from an optical pick-up unit be incident on an active recording layer of an optical disc, an optical recording medium, through an objective lens and thereby reproducing information recorded in the optical disc or recording information in the optical disc. The optical recording reproducing apparatus was disclosed in the application Ser. No. '5,661,711' registered in the U.S.A patent with a date of Aug. 26, 1997.

The optical recording medium or a magneto-optical recording medium can have high density recording capacity when a pit size is small and a track width is narrow. However, a structure of the recording medium including a protective layer, an active recording layer, and a reflective layer, a condensing method according to that, diffraction of a spot size of light collected on the recording medium in order to form a pit on the active recording layer of the recording medium are limited. According to this, an optical recording reproducing method has been actively researched.

Hereinafter, a conventional optical recording reproducing method using a far-field method will be explained with reference to FIG. 1. FIG. 1 shows an objective lens and an optical disc for explaining the conventional optical recording reproducing method using a far-field method.

As shown in FIG. 1, in the conventional optical recording reproducing method using a far field, laser beam irradiated from an optical pick-up unit (not shown) is concentrated into an optical disc through an objective lens 11 having a numerical aperture NA of approximately 0.5~0.6. Herein, the concentrated laser beam transmits a transparent substrate 12 of the optical disc and then is made to be incident on an active recording layer 13 of the optical disc. That is, in order to prevent the active recording layer 13 from being damaged due to the user's fingerprint, dust, and contamination material, the thick transparent substrate 12 is formed on the active recording layer 13 of the optical disc.

A recording density of the optical disc is determined by a size of the concentrated laser beam, and the size of the laser beam is determined by wavelength $\lambda$ of light source and the numerical aperture NA of the objective lens.

Therefore, in the conventional optical recording reproducing method using a far field method, a lens having a high refraction index, that is, high NA can not be used since the laser beam reaches to the active recording layer 13 by transmitting the thick transparent substrate 12.

Also, in order to form a focal point of the laser beam concentrated through the objective lens 11 on the active recording layer 13, the objective lens 11 and the active recording layer 13 have to maintain a constant distance. However, since a surface of the transparent substrate 12 is not generally smooth, it is impossible that the objective lens 11 contacts to the surface of the transparent substrate, the surface of the optical disc, thus records and reproduce a signal. According to this, a predetermined interval is necessary between the objective lens 11 and the optical disc, and a lens having high NA can not be used.

In order to solve said problems of the conventional optical recording reproducing method using a far field, recently, an optical recording reproducing method using a near field has been proposed as a method for enhancing a recording density in a region where diffraction of light is not generated.

A principle of the optical recording reproducing method using a near field will be explained as follows.

Incident light into a lens with a degree of an angle more than a critical angle is totally reflected when it progresses from glass having a high refraction index to air having a low refraction index. At this time, light having a very weak intensity is on a surface of the lens by the total reflection of light, which is called as evanescent wave. By using the evanescent wave, high resolution which was impossible in the conventional far field due to diffraction of light is possible. In the optical recording and reproducing optical system using the near field, light is totally reflected in the lens thus to generate the evanescent wave on the surface of the lens, and information is recorded and reproduced by coupling between the evanescent wave and the recording medium.

FIG. 2 shows a construction of the optical recording reproducing apparatus using the near field in accordance with the conventional art in order to explain an optical recording reproducing method using the near field.

As shown in FIG. 2, in the optical recording reproducing method using the near field, laser beam irradiated from the optical pick up unit (not shown) is focalized on an objective lens 22 having high NA through a slider 25 where the objective lens 22 is mounted, and evanescent wave generated from the focal point and an active recording layer 23 formed on the surface of the optical disc are coupled thus to record or reproduce information.

Therefore, in the optical recording reproducing method using the near field, the objective lens 22 having very high NA has to be used, the active recording layer has to be formed on the surface of the optical disc in order to form the focal point of the lens on the active recording layer 23 of the optical disc, and an interval between the objective lens and the optical disc surface has to be tens of nm which is less than wavelength of light.

According to this, a space for forming a passivation layer (for example, a transparent substrate) on an outer surface of the active recording layer 23 of the optical disc was not enough.

In the meantime, the objective lens 22 reciprocates the optical disc rotated in a high speed with a very near interval corresponding to tens of nm in order to scan a track of the optical disc. Also, laser beam is focalized on the active recording layer of the optical disc when information is recorded in the optical disc, which causes temperature of the surface of the optical disc to be increased.

According to an experimental result, temperature of the active recording layer is increased up to 200~250° C. in case of a magneto-optical disc, and increased up to 600° C. in case of a disc of a phase change method. At this time, temperature of the surface of the optical disc formed by a dielectric layer and a protective layer which protect the active recording layer is also increased up to 60~300° C., so that a following problem is generated on the surface of the objective lens adjacent to the surface of the optical disc.

That is, material constituting the optical disc and contamination material attached to the surface of the optical disc are transferred to the surface of the objective lens and a lower surface of the slider and coated by high heat of the surface of the optical disc. Herein, the contamination material includes transparent substrate material of the optical disc, hub material, cartridge material, material for constituting the surface of the optical disc such as a lubrication layer and a protective layer, material for constituting a man's fingerprint, dust, and etc. As a result of an analysis, the contamination material included carbon and fluorine compound mainly and sodium, silicone compound, and etc. were also detected.

Also, when information of the optical disc is continuously reproduced or information is continuously recorded in the optical disc, the contamination material attached to the surface of the optical disc is transferred to the surface of the objective lens and coated on the surface of the objective lens and on the lower surface of the slider by heat thus to decrease transmissivity of the objective lens. Besides, if the contamination material is coated on the surface of the objective lens for a long time, information can not be recorded in the optical disc and information recorded in the optical disc can not be reproduced.

SUMMARY OF THE INVENTION

Therefore, an object of the present invention is to provide an optical recording reproducing apparatus which can effectively remove contamination material attached thereto.

Another object of the present invention is to provide an optical recording reproducing apparatus which can effectively remove contamination material such as dust from an objective lens thereof.

Still another object of the present invention is to provide an optical recording reproducing apparatus which can effectively remove contamination material such as dust from a pick up head thereof which is facing to an optical disc in order to reproduce the optical disc or to record information in the optical disc.

Another object of the present invention is to provide an optical recording reproducing apparatus which can effectively remove contamination material such as dust from a surface of an optical disc.

To achieve these and other advantages and in accordance with the purpose of the present invention, as embodied and broadly described herein, there is provided an optical recording reproducing apparatus comprising: a catalyst layer formed at a specific part of the optical recording reproducing apparatus; and a light irradiation unit for irradiating light on the catalyst layer.

To achieve these and other advantages and in accordance with the purpose of the present invention, as embodied and broadly described herein, there is also provided an optical recording reproducing apparatus comprising: a catalyst layer formed on a surface of a slider which is formed near a surface of an optical disc and where an objective lens of the apparatus is mounted, for removing contamination material; and a light irradiation unit for irradiating light on the catalyst layer.

An optical recording medium used in an optical recording reproducing apparatus of the present invention comprises a catalyst layer for removing contamination material.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

An optical recording reproducing apparatus which can effectively remove contamination material attached thereto by forming a catalyst layer at all parts or at a specific part thereof will be explained with reference to FIGS. 3 to 6.

Figure 1:
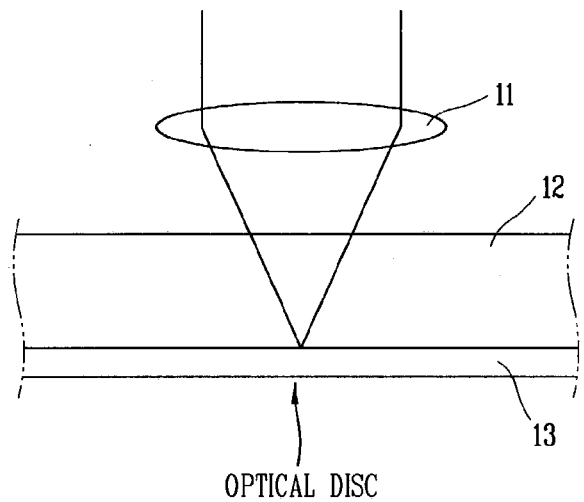
FIG. 1 is a view showing an objective lens and an optical disc of an optical recording reproducing apparatus in accordance with the conventional art.
Figure 2:
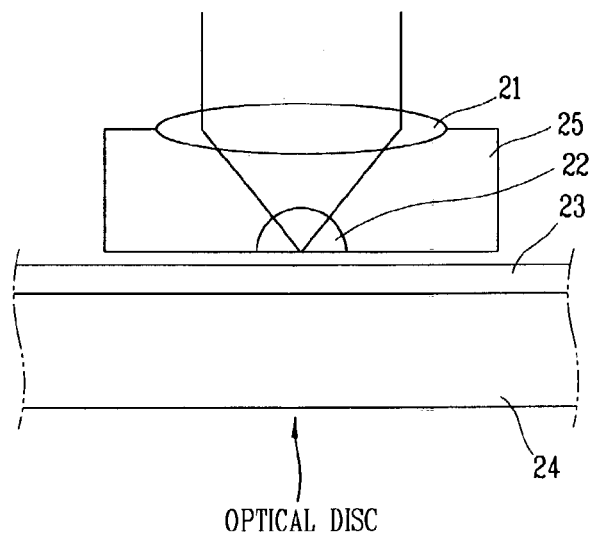
FIG. 2 is a view showing a construction of an optical recording reproducing apparatus using a near field in accordance with the conventional art.
Figure 3:
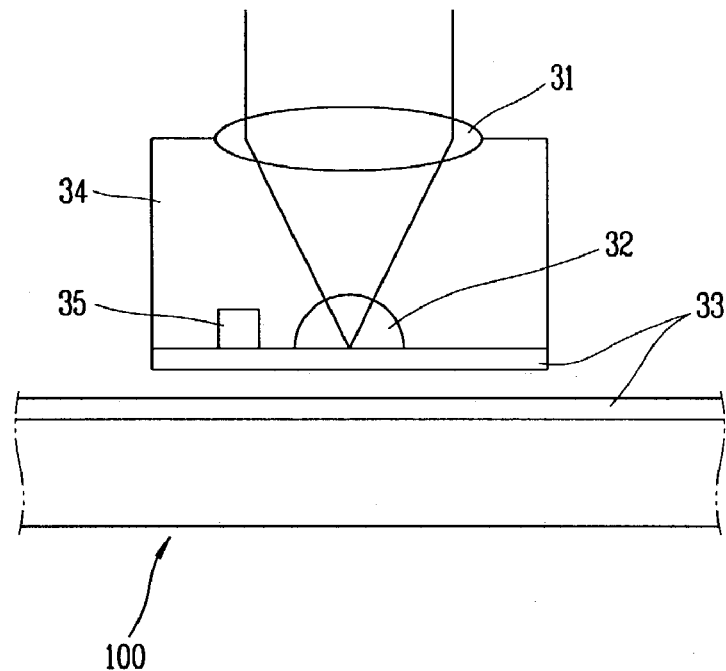
FIG. 3 is a sectional view showing a structure of an optical recording reproducing apparatus according to a first embodiment of the present invention.

FIG. 3 is a sectional view showing a structure of an optical recording reproducing apparatus according to a first embodiment of the present invention.

As shown in FIG. 3, the optical recording reproducing apparatus of the present invention comprises: a slider 34 formed near a surface of an optical disc 100; a first objective lens 31 formed at an upper part of the slider 34; a second objective lens 32 formed at a lower part of the slider 34 to face with the optical disc 100; a catalyst layer 33 formed on a lower surface of the slider 34 and on a surface of the second objective lens 32; and a light irradiation unit 35 formed at one side of the lower part of the slider 34 for irradiating light on the catalyst layer 33 so as to chemically react the catalyst layer 33. That is, laser beam irradiated from a light pick up unit (not shown) is made to be incident on the optical disc 100 through the first and second objective lens 31 and 32 thus to record or reproduce information, of which explanations will be omitted since they are same as the conventional art.

Herein, the catalyst layer 33 can be formed at all parts or a specific part of the optical recording reproducing apparatus in order to remove contamination material attached thereto. For example, it is possible that the catalyst layer 33 is formed on the surface of the second objective lens 32, on a surface of a pick up head of the optical recording reproducing apparatus which is directly facing with the optical disc in order to reproduce the optical disc or to record information, on the lower surface of the slider 34 where the objective lens of the apparatus is mounted, and on the surface of the optical disc 100.

Hereinafter, the optical disc used in the optical recording reproducing apparatus according to the present invention will be explained with reference to FIG. 4.

Figure 4:
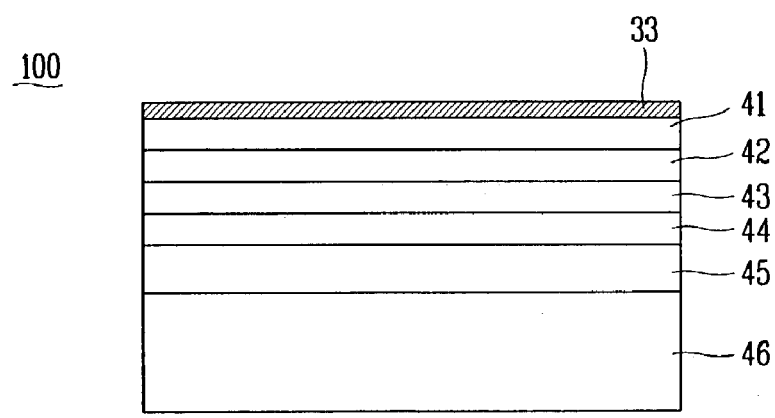
FIG. 4 is a view showing a structure of an optical disc used in an optical recording reproducing apparatus according to the present invention.

FIG. 4 is a view showing a structure of an optical disc used in an optical recording reproducing apparatus according to the present invention. That is, the present invention can remove contamination material which is on the surface of the objective lens and on the lower surface of the slider 34 by forming the catalyst layer 33 on the surface of the second objective lens 32, or the present invention can remove contamination material which is on the optical disc by forming the catalyst layer 33 on the optical disc.

As shown in FIG. 4, the optical disc includes: a transparent substrate 46; a reflective layer 45 formed on the transparent substrate 46; a first dielectric layer 44 formed on the reflective layer 45; an active recording layer 43 formed on the first dielectric layer 44; a second dielectric layer 42 formed on the active recording layer 43; a passivation layer 41 formed on the second dielectric layer 42; and a catalyst layer 33 formed on the passivation layer 41. Herein, the catalyst layer 33 is preferably formed on the uppermost surface of the optical disc 100 which is facing with the objective lens 32.

Hereinafter, a catalytic principle of the catalyst layer 33 formed of a catalytic material (for example, $TiO_2$) which accelerates light reaction will be explained with reference to FIG. 5.

Figure 5:
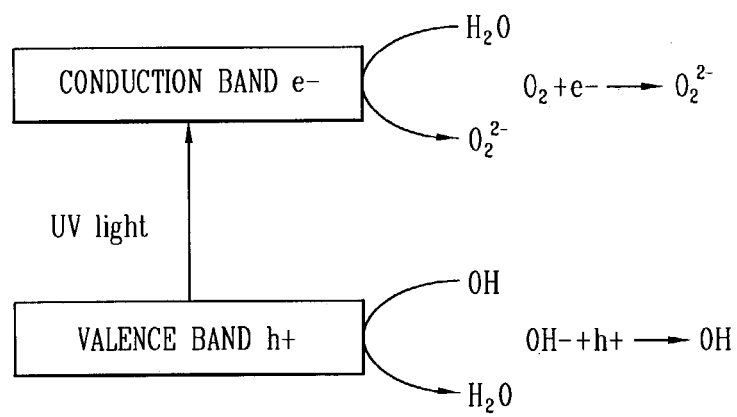
FIG. 5 is a conceptual view showing a principle of a catalytic reaction of a catalyst layer according to the present invention.

FIG. 5 is a conceptual view showing a principle of a catalytic reaction of a catalyst layer according to the present invention.

As shown in FIG. 5, when light of wavelength having energy more than band gap ($\lambda$<400 nm) (for example, ultraviolet rays) is irradiated on a surface of the $TiO_2$, electron on the surface of the $TiO_2$ is transferred to a conduction band from a valence band. At this time, hole is generated at the valence band. The generated electron and hole spread on the surface of the $TiO_2$.

If the hole is reacted with water or OH— ion on the surface of the $TiO_2$, OH radical is generated, and if the hole is reacted with oxygen which is under water, $O_2^{2-}$ radical is generated thus to generate more OH radical. The generated OH radical decomposes organic material (for example, contamination material) on the surface of the $TiO_2$, which is called as an optical catalyst reaction. At this time, the OH radical and $O_2^{2-}$ radical are operated as an oxidizing agent which oxides the organic material.

Also, $H_2O_2$, intermediate of said reaction, generates OH radical and $O_2^{2-}$ radical. Materials such as $H_2O_2$, $O_2$, and $HO_2$ prevent a reverse reaction by consuming the generated electron thus to increase a generation of the OH radical.

In the optical recording reproducing apparatus according to the present invention, if reactive light (ultraviolet rays) generated from the light irradiation unit 35 is irradiated on the catalyst layer 33 formed on the surfaces of the objective lens 32, the slider 32, and the optical disc 100, the catalyst layer 33 generates the chemical reaction thus to generate an oxidizing agent such as OH radical and $O_2^{2-}$ radical. The oxidizing agent oxidizes dust or contamination material of the surfaces of the slider 34 and the optical disc 100. The catalyst layer can be composed of $SiO_2$, ZnO, $WO_3$, and etc. besides the $TiO_2$.

Particles of the materials of $TiO_2$, $SiO_2$, ZnO, $WO_3$ have a size of 5 nm and less, and formed of nano colloid or liquid. Therefore, the catalyst layer 33 can be coated on all the parts or a specific part of the optical recording reproducing apparatus by being formed of a transparent thin film having transmittivity more than 98%. Also, the catalyst layer 33 can be coated on all the parts or a specific part of the optical recording reproducing apparatus by being formed of a transparent thin film having a thickness corresponding to tens of or hundreds of nm.

Figure 6:
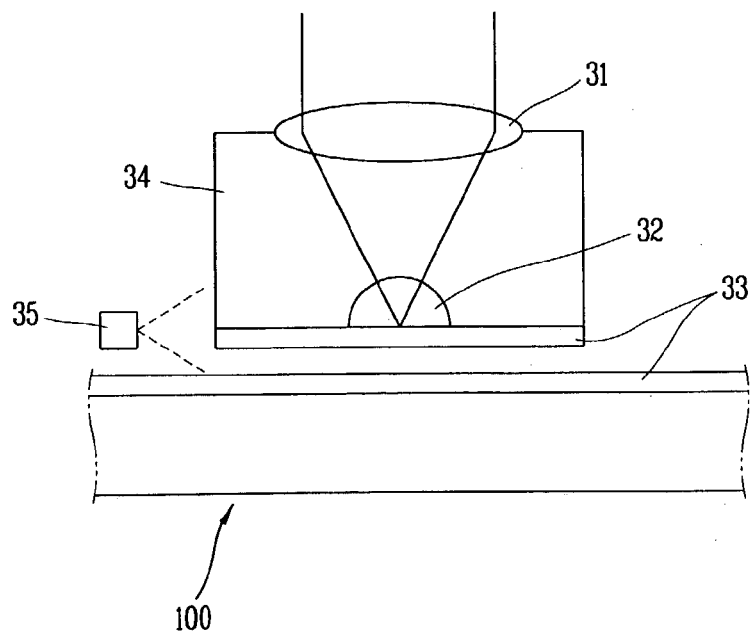
FIG. 6 is a sectional view showing a structure of an optical recording reproducing apparatus according to a second embodiment of the present invention.

FIG. 6 is a sectional view showing a structure of an optical recording reproducing apparatus according to a second embodiment of the present invention.

As shown, the apparatus comprises: the slider 34; the first objective lens 31; the second objective lens 32; the catalyst layer 33; and the light irradiation unit 35 formed at one side of the lower part of the slider 34 for irradiating light on the catalyst layer 33 formed on the surface of the optical disc 100, on the lower surface of the slider 34, and on the surface of the objective lens. Herein, the light irradiation unit 35 can be formed at various positions where light can be irradiated on the catalyst layer 33 formed on the surface of the optical disc 100 and the catalyst layer 33 formed on the lower surface of the slider 34 and on the surface of the objective lens.

In the present invention, the light irradiation unit 35 which generates reaction light such as ultraviolet rays is preferably used in order to chemically react the catalyst layer 33. However, a device for generating a small amount of ultraviolet rays emitted from a general white light can be used.

Also, the light irradiation unit 35 preferably irradiates the reaction light (ultraviolet rays) on the catalyst layer 33 for a predetermined time in order to reproduce information of the optical disc 100 or to record information in the optical disc 100 of the optical recording reproducing apparatus. For example, the light irradiation unit 35 preferably irradiates the ultraviolet rays on the catalyst layer 33 during reproducing information of the optical disc 100 or recording information in the optical disc 100, or later.

As aforementioned, in the present invention, the catalyst layer 33 is formed at all parts or a specific part of the optical recording reproducing apparatus in order to remove contamination material attached thereto, thereby removing contamination material attached to the optical recording reproducing apparatus effectively.

Also, in the present invention, the catalyst layer 33 is formed on the optical disc used in the optical recording reproducing apparatus, thereby effectively removing contamination material attached to the optical disc.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An optical recording reproducing apparatus comprising:
    a catalyst layer formed on an objective lens of the optical recording reproducing apparatus, an optical disc and a surface of a slider which is formed near the optical disc; and
    a light irradiation unit for irradiating light on the catalyst layer.

2. The apparatus of claim 1, wherein the catalyst layer is formed on the objective lens of the optical recording reproducing apparatus in order to remove contamination material attached thereto.

3. The apparatus of claim 1, wherein the light irradiation unit is formed on a surface of the objective lens of the optical recording reproducing apparatus.

4. The apparatus of claim 1, wherein the catalyst layer is formed on a surface of a pick up head of the optical recording reproducing apparatus which is directly facing with the optical disc in order to reproduce the optical disc or to record information in the optical disc.

5. The apparatus of claim 1, wherein the objective lens is mounted at the slider.

6. An optical recording reproducing apparatus comprising:
a catalyst layer formed on a surface of a slider which is formed near a surface of an optical disc and where an objective lens of the apparatus is mounted, for removing contamination material, wherein the catalyst layer is formed on the optical disc and the objective lens; and
a light irradiation unit for irradiating light on the catalyst layer, wherein the light irradiation unit irradiates the light on the catalyst layer during reproducing information of the optical disc or recording information in the optical disc.

7. The apparatus of claim 6, wherein the light irradiation unit irradiates light on the catalyst layer in order to react the catalyst layer chemically.

8. The apparatus of claim 6, wherein the light irradiation unit irradiates ultraviolet rays on the catalyst layer.

9. The apparatus of claim 6, wherein the light irradiation unit irradiates ultraviolet rays on the catalyst layer for a predetermined time during reproducing information of the optical disc or the recording information in the optical disc.

10. The apparatus of claim 6, wherein the light is ultraviolet rays.

11. The apparatus of claim 6, wherein the catalyst layer includes at least one of $TiO_2$, $SiO_2$, ZnO, and $WO_3$.

* * * * *